(12) United States Patent
Bustamante et al.

(10) Patent No.: US 7,148,811 B1
(45) Date of Patent: Dec. 12, 2006

(54) EMERGENCY UNDERWATER NOTIFICATION DEVICE

(75) Inventors: Michael John Bustamante, Southlake, TX (US); Anthony M. Scott, Southlake, TX (US); Brian A. Amond, Southlake, TX (US)

(73) Assignee: Pungar Corporation, Southlake, TX (US)

( * ) Notice: Subject to any disclaimer, the term of this patent is extended or adjusted under 35 U.S.C. 154(b) by 122 days.

(21) Appl. No.: 10/979,519

(22) Filed: Nov. 2, 2004

Related U.S. Application Data

(60) Provisional application No. 60/516,813, filed on Nov. 3, 2003.

(51) Int. Cl.
*H04B 13/02* (2006.01)

(52) U.S. Cl. ............... 340/850; 340/425.1; 340/531; 367/131; 367/141

(58) Field of Classification Search ............. 340/573.1, 340/850
See application file for complete search history.

(56) References Cited

U.S. PATENT DOCUMENTS

| | | | | |
|---|---|---|---|---|
| 4,812,820 A | * | 3/1989 | Chatwin | ............... 340/518 |
| 6,054,929 A | * | 4/2000 | Garofalo et al. | ........... 340/626 |
| 6,639,520 B1 | * | 10/2003 | Nomura et al. | ............. 340/905 |
| 6,762,678 B1 | * | 7/2004 | Arens | ........................ 340/506 |
| 2002/0176323 A1 | * | 11/2002 | Magine et al. | ............. 367/134 |

\* cited by examiner

*Primary Examiner*—Daniel Wu
*Assistant Examiner*—George A. Bugg

(57) ABSTRACT

The emergency underwater notification device disclosed, one of which would be carried by each diver on a team of divers at a dive site, comprises (a) an activator; (b) one or more primary signal emitters, each of which emits a primary notification signal upon activation of the activator, the primary signal emitter comprising one or more of the following: a light source, a hydrophone, a siren, a speaker, or an acoustic transducer; (c) one or more secondary signal emitters, each of the secondary signal emitters emitting a secondary communication signal upon activation of the activator; (d) a receiver capable of receiving communication signals; (e) one or more tertiary signal emitters, each of the tertiary signal emitters to emit a tertiary communication signal upon receipt by the receiver of either a secondary communication signal or a tertiary communication signal from another notification device; and (f) one or more quaternary signal emitters, each of the quaternary signal emitters to emit a quaternary notification signal upon receipt by the receiver of either a secondary communication signal or a tertiary communication signal from another notification device, the quaternary signal emitter comprising one or more of the following: a light source, a hydrophone, a siren, a speaker, or an acoustic transducer.

20 Claims, 6 Drawing Sheets

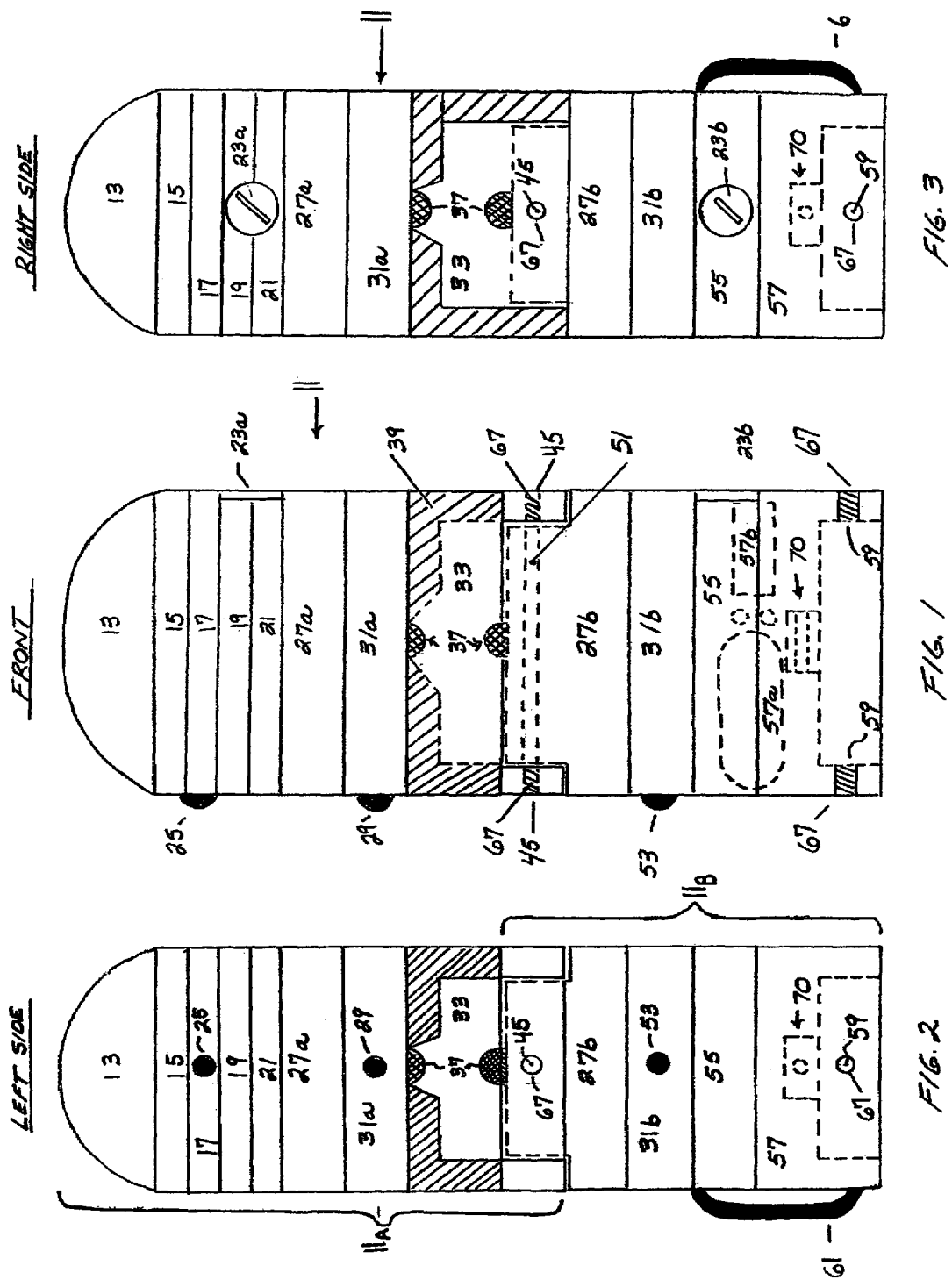

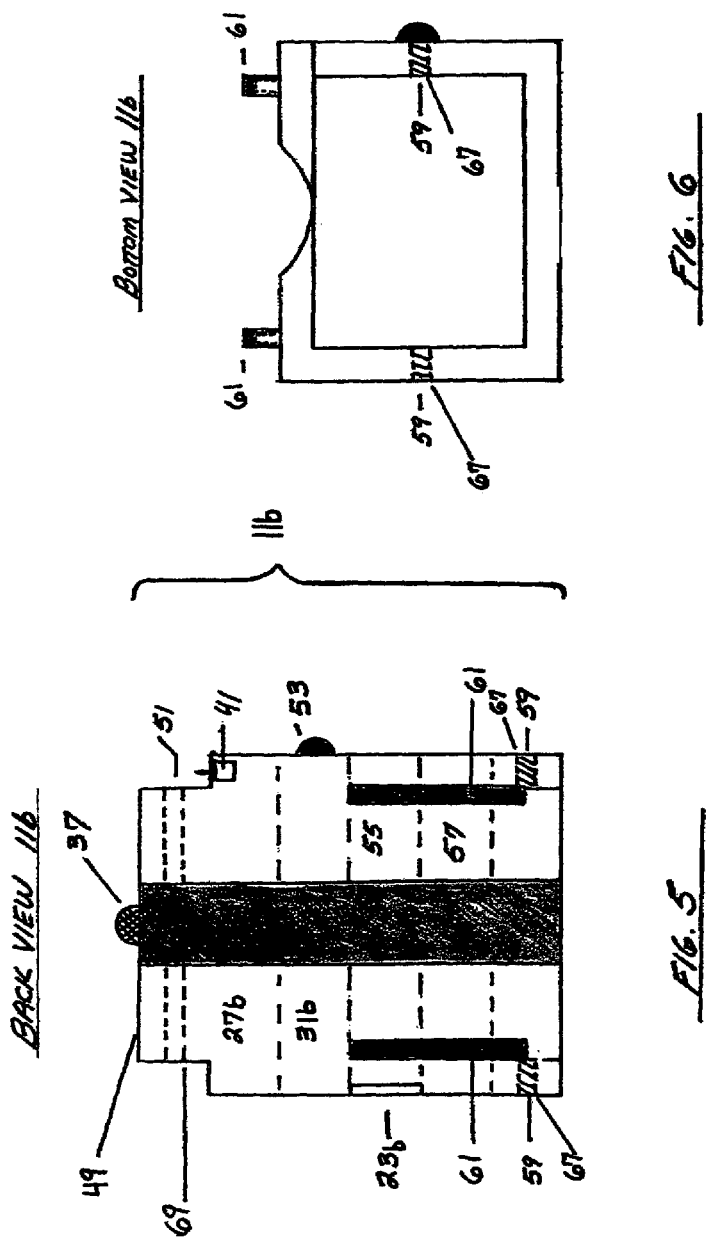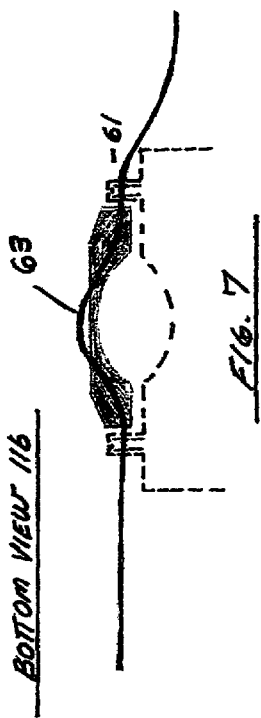

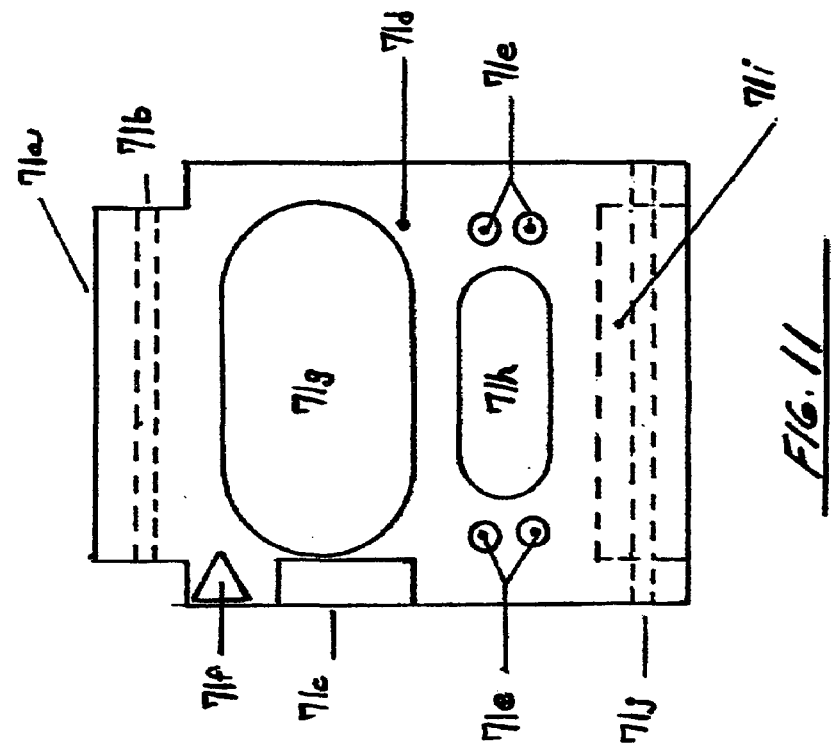
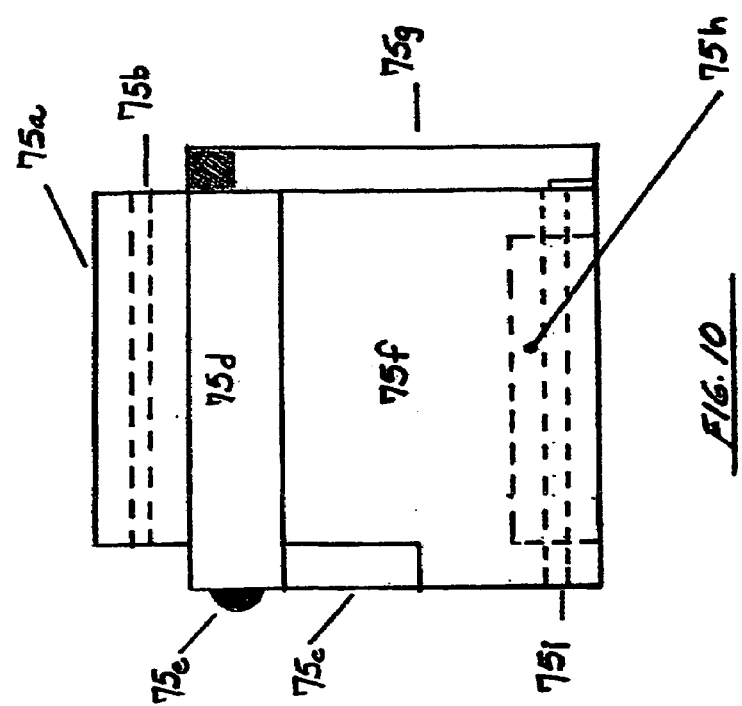

US 7,148,811 B1

EMERGENCY UNDERWATER NOTIFICATION DEVICE

CROSS-REFERENCE TO RELATED APPLICATIONS

This application claims the benefit of U.S. Provisional Patent Application No. 60/516,813, filed Nov. 3, 2003 (entitled "An Emergency Underwater Notification Device"), and applicant incorporates the entirety of that provisional patent application herein by reference.

BACKGROUND OF THE INVENTION

This invention relates to underwater signaling devices and emergency signaling devices used by scuba divers to perform multiple tasks in a diving emergency. SCUBA is an acronym referring to divers using a Self-Contained Underwater Breathing Apparatus.

Prior Art Underwater Signaling Devices in General.

Underwater signaling devices have been used in scuba diving for years. Some underwater signaling devices use air from the scuba tank which produces an audible low-frequency horn-like sound. Others are designed to bang against the outside of the scuba tank which produces an audible low-frequency clanking-type sound. Still others have been designed to produce a low rattle-type or clicking sound with very limited range.

A Key Need: Signaling Devices Tailored for Emergency Use.

These prior art existing signaling devices are general purpose in nature, and, without a great deal of pre-dive planning, their use in no way indicates an emergency situation in progress under water. Furthermore, they simply are not designed with the goal of effective management of an emergency situation.

To understand this, it must first be understood that sensory limitations, specifically visual and auditory limitations, make the scuba diving experience a somewhat isolating one. For example, because of the visual limitations inherent in scuba diving, divers typically pay attention only to their immediate surroundings, in a radius of ten to fifty feet around them, and their safety focus is therefore upon themselves and their diving buddy, who is ordinarily very close by.

In addition, auditory limitations, specifically the inability of other divers to hear the human voice, even when a diver is screaming or yelling for help underwater just a few feet away, force divers to rely almost entirely upon their limited sense of sight, specifically line-of-sight, to keep track of their dive buddy, and this is a serious limitation even in good visibility situations.

Studies of the nature and causes of underwater emergencies lend further support to the critical need for effective communication between and among divers during emergency situations. Statistics indicate that causes of dive emergencies fall in to several categories including: (a) separation from dive buddy (e.g., loss of visual contact due to water clarity; loss of visual contact due to obstructions and distance); (b) equipment failure; (c) underwater entrapment; (d) depletion of air supply; (e) panic; and (f) physical causes (e.g., injuries, illness, fatigue).

The situation is further complicated by the following unfortunate reality: notwithstanding the dictates of prudence, many divers simply do not carefully pre-plan audible emergency signal meanings and protocols with other divers in advance, and most carry no signaling device at all. This not only delays recognition of an emergency situation, in addition, it delays coordination of a response by the group. Group coordination is critical, because multiple divers may be necessary to address the emergency under water, and most dive boat captains are precluded from leaving the location of a dive without all divers in hand (and, yes, lives are lost due to delays in retrieving the entire starting contingent of divers).

Finally, even when an emergency is recognized, current diving emergency practices are frequently limited to the ineffectual use of underwater lights and hand signals as means of visual communication.

Against this backdrop is arrayed the current state of the art in underwater signaling devices, as described above. Tank bangers, air horns, and the like are useful, but these devices are all-purpose signaling devices which are typically used as an ad hoc means of merely attracting the casual, local, non-emergency attention of a single near-by diver. The sound produced by these all-purpose devices has no predetermined meaning to any diver in the water. As a result, other divers in the water regularly ignore these sounds, especially when they are perceived as being far away and not directed specifically to gain that specific diver's attention.

The problem, concisely stated, is this: prior art signaling devices are not specifically designed to address the signaling needs unique to underwater emergency situations. Furthermore, even among the various organizations whose missions include the development of improvements to diver safety oriented equipment and procedures, there is no standard signal, signaling protocol, or signaling device that specifically alerts divers to an underwater emergency.

After Ascent: the Need for Accurate Dive Information at the Surface.

Furthermore, emergencies don't end upon ascent. Frequently, after emergency ascents to the surface, a new problem arises. Divers forced to ascend rapidly due to an emergency may need to undergo recompression treatment, and there is therefore a critical need for comprehensive information about the diver's time under water from the onset of, during, and throughout the resolution of the emergency.

Although there is an increasing trend in diving practices towards the use of personal dive computers and electronic pressure gauges to provide the diver with normal diving information, the limitations of these systems in the face of a need for a clear, easily accessible dive record becomes acutely apparent. Prior art dive computers are simply not designed to record or log, for future use, emergency-related dive information. Also, data retrieval from these systems, in most cases, requires a working knowledge of the unit (and its proprietary user interface) and/or access to the proper hardware, software, and interfaces necessary to extract the data. Thus, valuable time is lost again as divers endeavor to extract critical information from dive computers with which they are not familiar. Finally, these devices typically stop recording data when they are brought to the surface.

It is to these underwater emergency management needs, and other circumstances in which expedited, efficient notification is required, that the instant invention is directed.

BRIEF SUMMARY OF THE INVENTION

The invention disclosed herein transforms a team of divers, who ordinarily are loosely coordinated and therefore prone to lose precious minutes, into a team that immediately recognizes, and coordinates in response to, an emergency.

The emergency underwater notification device ("E.U.N.D.") disclosed, one of which would be carried by each diver on a team, comprises (a) an activator; (b) one or more primary signal emitters, each of which emits a primary notification signal when the activator is triggered, the primary signal emitter comprising one or more of the following: a light source, a hydrophone, a siren, a speaker, or an acoustic transducer; (c) one or more secondary signal emitters, each of the secondary signal emitters emitting a secondary communication signal when the activator is triggered; (d) a receiver capable of receiving communication signals; (e) one or more tertiary signal emitters, each of the tertiary signal emitters to emit a tertiary communication signal upon receipt by the receiver of either a secondary communication signal or a tertiary communication signal from another device; and (f) one or more quaternary signal emitters, each of the quaternary signal emitters to emit a quaternary notification signal upon receipt by the receiver of either a secondary communication signal or a tertiary communication signal from another device, the quaternary signal emitter comprising one or more of the following: a light source, a hydrophone, a siren, a speaker or an acoustic transducer.

In a typical embodiment, when the activation sequence is initiated on the Emergency Underwater Notification Device (the "E.U.N.D."), the specific E.U.N.D. device in the distressed diver's possession initiates, inter alia, the following functions: (a) it turns on a strobe light to visually alert other nearby divers to the distressed diver's emergency; (b) it emits an audible signal as well to further alert other nearby divers; (c) it emits an inaudible signal to alert other E.U.N.D. devices located farther away; and (d) it commences recording dive telemetry (although dive telemetry recording may also be configured to occur continuously whenever the E.U.N.D. is turned on, with marking to occur whenever the activation sequence is initiated).

Similarly, all other E.U.N.D. devices within network range will perform, inter alia, the following operations: (a) receive the inaudible signals from the E.U.N.D. of the distressed diver; (b) turn on their respective strobe lights for up to thirty seconds in response; (c) emit audible signals as well for up to thirty seconds; and (d) further re-broadcast the inaudible signals to further pass along the emergency notification signal to other remote E.U.N.D. devices.

BRIEF DESCRIPTION OF THE SEVERAL VIEWS OF THE DRAWINGS

FIG. 1 is a front cutaway view of the present invention.

FIG. 2 is a left side cutaway view of the invention in FIG. 1.

FIG. 3 is a right side cutaway view of the invention in FIG. 1.

FIG. 5 is a back view of lower assembly 11b of the invention in FIG. 4.

FIG. 6 is a bottom view of 11b of the invention in FIG. 5.

FIG. 7 is a bottom view of a means of securing the invention to a fixture.

FIG. 10 is a front view of emergency position locator attachment 75.

FIG. 11 is a front view of diving computer attachment 71.

DETAILED DESCRIPTION OF THE INVENTION

Cross-Reference to Related Applications

Figure 4:
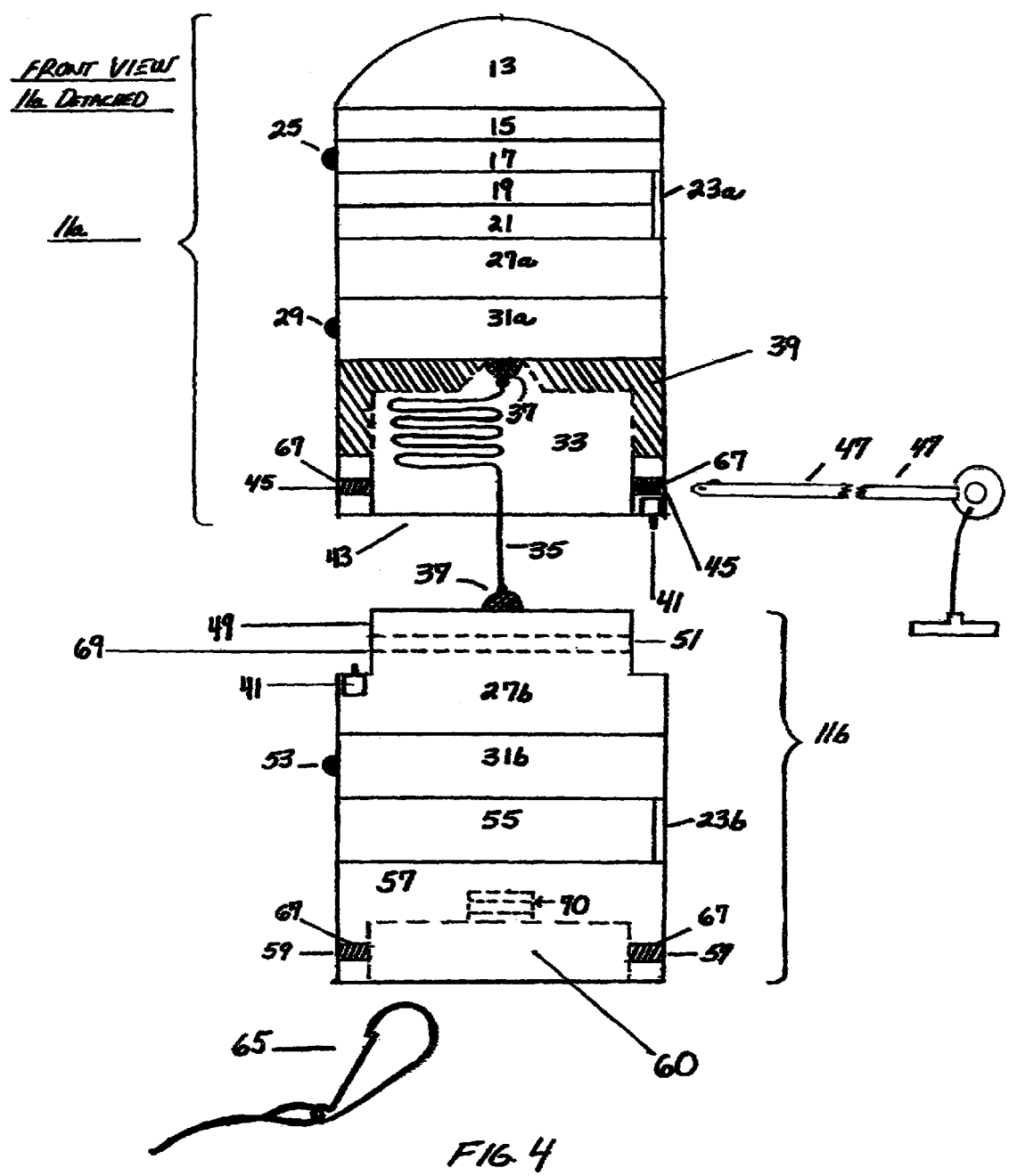
FIG. 4 is a front view of the invention in FIG. 1 with upper assembly 11a detached from lower assembly 11b.

This application claims the benefit of U.S. Provisional Patent Application No. 60/516,813, filed Nov. 3, 2003 (entitled "An Emergency Underwater Notification Device"), and applicant incorporates the entirety of that provisional patent application herein by reference.

OVERVIEW OF THE INVENTION

General Considerations

In general, there are approximately eleven stages that must be negotiated to ultimately resolve an underwater emergency: (a) the emergency occurs; (b) the distressed diver attempts to summon help from his/her dive buddy, other divers, and/or the boat operator; (c) the distressed diver (and buddy) ascend and surface safely; (d) the distressed diver is brought on-board and initial aid rendered; (e) other divers must be notified of the emergency; (f) other divers must ascend and surface safely; (g) notification and safe ascent of all other divers must be repeated until all divers are accounted for; (h) transportation to shore; (i) transportation from port to medical facilities; (j) assessment of distressed diver and treatment at medical facility; and (k) resolution of the emergency.

Important Invention Objectives.

The most important resource to manage effectively during an underwater emergency is this: time. More specifically, the dive team must do everything it can to reduce, as much as humanly possible, the period of time that elapses from the occurrence of the emergency (see step (a) above) to the administration of comprehensive medical treatment (see step (j) above). The invention, the Emergency Underwater Notification Device (the "E.U.N.D."), expedites the eleven step process above for emergencies occurring underwater in several different ways.

A first function of the E.U.N.D. is local notification. That is, when the E.U.N.D. is activated by a diver in distress, it will produce a strobe and/or a loud and unique sound capable of being detected by other divers underwater within fifty yards. This primary signal, a notification signal detectable by the human senses, should also be visible and/or audible at the dive boat hydrophone. The sound, which is particularly effective in securing the attention of divers whose line-of-sight attention is directed elsewhere, is produced though the use of a hydrophone, a siren, a speaker, or an acoustic transducer. Assemblies which contain one or more of the hydrophone, siren, speaker, or acoustic transducer are referred to herein as HSST assemblies (or, simply, HSST's) although this assembly typically contains other important components as well.

A second function of the E.U.N.D. is network notification. That is, when the E.U.N.D. is activated by a diver in distress, it will produce a secondary signal, a communication signal which will commonly be an electromagnetic or acoustic signal (inaudible to the human ear), that will result, upon reception, in two actions taken by all other E.U.N.D.'s within range: (a) all other E.U.N.D.'s will then extend the reach of the secondary signal by re-transmitting a tertiary signal (another inaudible communication signal) so as to extend the effective reach of network notification, so that the occurrence of an emergency is transmitted across as broad an area as possible, to as many diver E.U.N.D.'s within range as possible; and (b) all E.U.N.D.'s receiving either a secondary communication signal or a tertiary communication signal from another E.U.N.D. will activate a quaternary signal (a notification signal), a unique strobe and/or audio notification (the latter through the HSST) for a period of approximately ten to thirty seconds (after which at least the audio, and possibly both strobe and audio, will switch off), to instantly notify/alert all other divers on the team of the fact that an emergency is in progress (i.e., "fellow diver in distress").

When the divers on a team learn that there is a fellow "diver in distress", they will all then either (a) see if they can quickly locate and assist the distressed diver (whose E.U.N.D. will continue to strike the alarm); or (b) quickly return to the dive boat as pre-planned to coordinate their response, both productive responses. Furthermore, the dive boat will also be able to use both the primary notification signal and the secondary communication signal to facilitate locating the distressed diver (as distinguished from the other divers on the team).

A third function of the E.U.N.D. is visual pinpointing, including extended-reach visual pinpointing. As discussed above, when the E.U.N.D. is activated by a diver in distress under water, it will display a highly visible strobe light. This facilitates a visual pinpointing of the location of the diver in distress. However, occasionally, the driver is trapped under, behind or near large objects that may block other divers' ability to see the strobe. The E.U.N.D. strobe is designed so that the portion of the E.U.N.D. to which it is attached can be detached from the other portion of the E.U.N.D. and floated via lanyard up some ten to fifty feet. This literally transforms the E.U.N.D. into a lighthouse, helping other divers to locate the diver in distress. Additionally, even divers that are not equipped with the E.U.N.D. will be able to observe the strobe light and act accordingly.

A fourth function of the E.U.N.D. is surface notification. That is, the E.U.N.D. can also be used for surface notification to attract the attention of watercraft and aircraft when activated by a diver in distress. The strobe is highly visible when used on the surface and very effective at night. It may be visible for up to two miles on the water surface and from even greater distances from the air. Additionally, a diver in distress will be able to project an audible signal at the surface that could potentially be heard by their dive boat or other boats in the near area (easily from distances of fifty to one hundred yards.

A fifth function of the E.U.N.D. is dive emergency logging. That is, the E.U.N.D. facilitates recording telemetry for the distressed diver. The data recorded includes the following: (a) start time of accident; (b) depth of accident and max depth of rescue; (c) minutes at depth of accident; (d) water temp at time of accident; (e) ascent in feet per second; (f) ascent in feet per minute; (g) stop interval(s) depth (related to safety stops); (h) stop interval(s) time (related to safety stops); (i) surfacing time; and (j) time from surface to treatment (hyperbolic chamber). All of the data is retrievable from the LCD screen built in to the unit, using a basic scroll function, without the use of supplemental hardware, software, interfaces, or even a working knowledge of the E.U.N.D.

When the functions described above are compared to the stages of a typical emergency, the benefits of the E.U.N.D. device network become clear. The E.U.N.D. significantly reduces the time necessary for the distressed diver to attract attention and obtain aid under water. It reduces the time necessary for the distressed diver to attract the attention of the boat operator and be brought on-board. It reduces the time necessary for other divers to be notified that there is an emergency, so that they can quickly prepare for and execute their ascent to the surface. It reduces (and, in many cases, effectively eliminates) the time spent conducting searches for other divers on the team who are out of visual range. It even reduces the time necessary for the boat operator, who has been quickly notified of an emergency, to begin preparations to get the distressed diver to shore (e.g., hailing assistance from other boats or on-water services, notifying necessary personnel on shore, etc.). Finally, back on shore, it reduces the time necessary for medical personnel to formulate a suitable treatment plan for the distressed diver.

Furthermore, the E.U.N.D. does all of these things by facilitating an immediate appreciation for the occurrence of an emergency, and by facilitating effective and extensive communication among divers, boat operators, emergency mobilization personnel, and treatment professionals, and it does all of these things without consuming any of the divers' most important asset, their respective air supplies.

DETAILED DESCRIPTION

With reference now to the drawings, and in particular with reference to FIG. 1, FIG. 2 and FIG. 3, a preferred embodiment of the E.U.N.D. (Emergency Underwater Notification Device) 11 of the present invention is illustrated. Reference to these figures, as well as FIG. 4, reveals that the invention comprises upper assembly 11a and lower assembly 11b.

Returning, now, to FIG. 1, typically, E.U.N.D. 11 has a water tight body length of approximately 6 to 8 inches and approximately 2 to 2.5 inches in width and approximately 1.5 to 2.5 inches in depth. Device 11 is preferably manufactured of high grade plastic resin or compound or other appropriate material.

Top surface 13 is composed of clear translucent material such as polycarbonate, acrylic, or other translucent material. This top surface 13 is sealed and/or molded to the watertight body 11. Top surface 13 is hollow inside to allow the mounting of strobe light bulb and mounting fixture 15 (containing a strobe light/light bulb which serves as the source of the visual primary notification signal in the event of an emergency). Top surface 13 is water tight and constructed to a tolerance able to withstand underwater pressures found at a depth of four hundred feet.

Electronic strobe package 17, located inside water tight body 11, contains strobe light controls and wiring to connect strobe light and mounting fixture 15 to external manual on/off switch 25 (also known as activator 25) and, in an alternative embodiment, to momentary switch 29 as well.

Optional compartment for buoyancy 21, located inside water tight body 11, may contain foam or other appropriate buoyant material to make upper assembly 11a positive buoyant.

Upper assembly battery compartment 19 is designed to accommodate batteries of suitable voltage and size, and wiring connecting to on/off switch 25. Upper assembly battery compartment 19 is accessed through water tight battery access door with locking mechanism 23a.

An HSST assembly 27a contains both (a) one or more of an internal/external hydrophone, siren, speaker, and/or transducer assembly, which constitute the source(s) of one or more primary notification signal(s) (here, auditory signals); and (b) a transmitter/emitter which emits a secondary communication signal (said signal being an electromagnetic or radio frequency signal or inaudible acoustic signal appropriate for device-to-device communication). The HSST 27a is located inside watertight body 11, and it is connected to upper assembly battery compartment 19 and to activator 25 by HSST electronics package 31a. The internal/external hydrophone, siren, speaker, and/or transducer assembly are also, potentially, connected to momentary switch 29 by HSST electronics package 31a.

Assembly 11a facilitates the local notification function described above. That is, when the E.U.N.D. is activated by a diver in distress, it produces a strobe and/or a loud and unique sound capable of being detected by other divers underwater within fifty yards. This primary signal, a notification signal detectable by the human senses, should also be visible at the boat and/or audible at the dive boat hydrophone. The sound is produced though the use of a hydrophone, a siren, a speaker, or an acoustic transducer. HSST 27a also produces a secondary signal, a communication signal, which will commonly be a radio or acoustic signal (inaudible to the human ear). Unlike the primary signal, which is directed towards human recipients, this secondary signal is directed towards any other E.U.N.D. devices that may be within range.

Upper assembly 11a is further comprised of foam insert 39 located inside lanyard compartment 33, lanyard 35, lanyard connector 37, hole for retaining pin 45, and metal sleeve insert 67 as shown.

E.U.N.D. 11 is further comprised of lower assembly 11b. The lower assembly 11b contains lanyard connector 37 and hole for retaining pin 51. HSST 27b, located inside watertight lower assembly 11b, is connected to lower assembly battery compartment 55 and to master on/off switch 53 by HSST electronics package 31b. Lower assembly battery compartment 55 is accessed through water tight battery access door with locking mechanism 23b.

HSST assembly 27b contains both (a) one or more of an internal/external hydrophone, siren, speaker, and/or transducer assembly, which constitute the source(s) of one or more quaternary notification signal(s) (here, auditory signals); (b) a transmitter/emitter which emits a tertiary communication signal (said signal being an electromagnetic or radio frequency signal or inaudible acoustic signal appropriate for device-to-device communication); and (c) a receiver capable of detecting, receiving, and interpreting the secondary communication signals and tertiary communication signals transmitted from other notification devices. The HSST 27b is located inside watertight body 11, and it is connected to lower assembly battery compartment 55 by HSST electronics package 31b.

It should also be noted that assembly 11b could also be equipped with a strobe light/lighting assembly, so that it could also emit a distinct visual quaternary notification signal (which might well be different in visual appearance from the primary notification signal so as to distinguish the diver in distress from the diver(s) giving aid).

Assembly 11b is designed particularly to facilitate the network notification function described above. That is, when the E.U.N.D. is activated by a distressed diver (i.e., one who has succumbed to an emergency situation), and the secondary communication signal which has been emitted by the distressed diver's E.U.N.D. is picked up by a non-distressed diver's E.U.N.D., then the following two actions will be taken by the non-distressed diver's E.U.N.D.: (a) the E.U.N.D. will then extend the reach of the secondary signal by re-transmitting a tertiary signal (another inaudible communication signal) so as to extend the effective reach of network notification, so that the occurrence of an emergency is transmitted across as broad an area as possible, to as many non-distressed diver E.U.N.D.'s within range as possible; and (b) the E.U.N.D. will activate a quaternary signal (a notification signal), such as a unique, differentiated strobe and/or audio notification (the latter through the HSST) for a period of approximately ten to thirty seconds (after which at least the audio, and possibly both strobe and audio, will switch off), to instantly notify/alert all non-distressed divers within range to the fact that an emergency is in progress.

It should be noted that the HSST 27b of assembly 11b will emit its tertiary communication signal and quaternary notification signal upon receipt of either a secondary communication signal (from another diver who is himself in distress) or a tertiary communication signal (from another diver who is not himself in distress). Thus, the E.U.N.D. device network acts as a relay network, communicating, as quickly as possible, the fact that an emergency has occurred to all of the divers on the team. As part and parcel of the concept of an effective relay network, it is generally the case that the E.U.N.D. devices are designed not to emit their tertiary or quaternary signals upon receipt of an "echo" of the secondary or tertiary signals they themselves emitted, but, rather, emit such signals upon receipt of a secondary or tertiary signal emitted from another device.

The use of a scheme of primary and secondary signals (originating directly from the distressed diver) and tertiary and quaternary signals (originating, by relay, from non-distressed divers on the dive team) makes it possible for the divers and dive boat to use both the primary notification signal and the secondary communication signal to facilitate locating the distressed diver (as distinguished from the other divers on the team).

It should be noted that assemblies 11a and 11b, and all of the HSST assemblies (e.g., 27a, 27b, 81h, etc.), as well as all of the relevant attachments described herein, may be alternatively equipped with any or all of the receivers, transmitter/emitters, lights (including strobe lights), hydrophones, sirens, speakers, and/or acoustic transducers necessary to send or receive any one or all of the primary, secondary, tertiary, or quaternary signals described herein.

For example, in a particularly effective embodiment, lower assembly 11b and associated HSST assembly 27b could be effectively configured so as to receive the secondary or tertiary signals of another device while upper assembly 11a and associated HSST 27a are configured to transmit the primary, secondary, tertiary and quaternary signals activated in a particular emergency. Alternatively, both upper and lower assemblies 11a and 11b could feature fully duplicative sets of receivers and transmitter/emitters, with appropriate integration, so that each assembly serves as a redundant backup of either specific functions or of the entire operability of the other.

Returning, now, to lower assembly 11b, the assembly 11b also contains telemetry recording device 57, telemetry display 57a, telemetry display buttons 57b, hole for retaining pin 59, and metal sleeve insert 67. Telemetry recording device 57 generates a read out on telemetry display 57a, said display operated through the use of buttons 57b. The telemetry recording device facilitates the dive emergency logging function as described above.

A slot for strap attachment 61 is apparent in FIG. 2, FIG. 3, FIG. 5, FIG. 6, & FIG. 7.

With reference to FIG. 4, E.U.N.D. 11 assemblies 11a and 11b are separated at female separation joint 43 and male separation joint 49 when emergency activation retaining pin 47 is removed. When emergency activation retaining pin 47 is removed, upper assembly 11a will float towards the water surface away from lower assembly 11b, engaging automatic emergency activation contact switch 41 located in both the upper assembly 11a and the lower assembly 11b. Emergency activation contact switch 41 activates the E.U.N.D. in the same way as activator 25.

The upper assembly 11a remains connected to the lower assembly 11b via lanyard 35 attached to both assemblies 11a and 11b at lanyard connectors 37. 11b further comprises a hole for retaining pin 51 with metal sleeve insert 69. Also attached to 11b is safety retention lanyard 65 attached via clip connector at recessed lanyard connection point 70, which is located inside female separation joint 60.

The use of the lanyard 35 to connect assembly 11a and 11b facilitates the extended-reach visual pinpointing function described above. After the E.U.N.D. is activated by a diver in distress under water, in those cases in which the driver is trapped under, behind or near large objects that may block other divers' ability to see the strobe and/or pick up the secondary communication signal, the diver in distress can float assembly 11a up via lanyard some ten to fifty feet to facilitate the transmission of the primary notification and secondary communication signals. This literally transforms the E.U.N.D. into a lighthouse, helping other divers to locate the diver in distress.

FIG. 5 depicts the back view of lower assembly 11b. FIG. 6 depicts the bottom view of lower assembly 11b. FIG. 7 depicts a typical mechanism for attaching/securing lower assembly 11b to a fixture such as a diver's buoyancy compensation device (BCD), using Velcro strap and retainer 63.

FIGS. 8 through 13 depict a series of modules which may be independently joined to the E.U.N.D. to accomplish specific additional objectives based upon the goals and associated safety considerations for a particular dive. These modules, or attachments, join with the base of the lower assembly 11b, and include: (a) a remote repeater; (b) a surface signaling package; (c) an internationally recognized emergency position locator; (d) a diving computer; (e) a diving light; and (f) a mount for a luminous chemical cylindrical tube.

Figure 8:
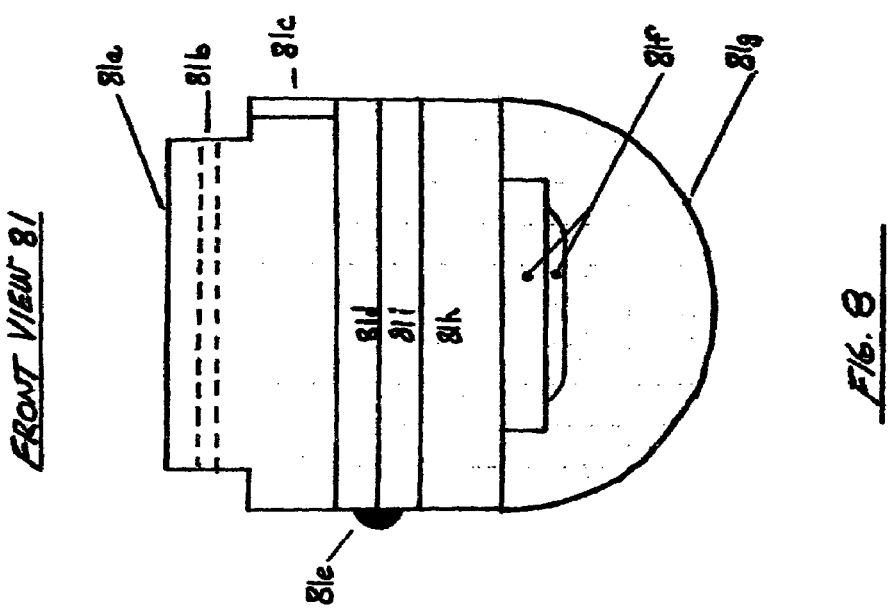
FIG. 8 is a front view of remote repeater attachment 81.

With reference now, specifically, to FIG. 8, remote repeater 81 will attach to female separation joint 60. Remote repeater 81 comprises male separation joint 81a, retaining pin hole 81b, water-tight battery access door w/locking mechanism 81c, electronics package for HSST 81d, water proof 3-way on/off switch 81e, strobe light bulb and mounting fixture 81f, clear lens for strobe light 81g, HSST 81h, and electronics package for strobe light 81i as shown.

HSST assembly 81h contains both (a) one or more of an internal/external hydrophone, siren, speaker, and/or transducer assembly, which constitute the source(s) of one or more primary notification signal(s) (here, auditory signals); (b) a transmitter/emitter which emits a secondary communication signal (said signal being an electromagnetic or radio frequency signal or inaudible acoustic signal appropriate for device-to-device communication); and (c) a receiver capable of detecting and receiving secondary communication signals from another notification device. The HSST 81h is connected to HSST electronics package 81d, and electronics package for strobe light 81i (which in turn is connected to strobe light bulb and mounting fixture 81f which operates as another primary notification signal).

In operation, the remote repeater 81 is particularly helpful if a diver is about to enter a wholly or partially enclosed area, such as an underwater ship wreck site on the sea floor. Upon entry into such a partially enclosed space, for example, the diver could detach remote repeater 81 from his E.U.N.D. and secure it to a prominent location on the ship. Then, if the diver encountered trouble inside the ship, he could activate his E.U.N.D. The E.U.N.D. would, as described above, emit a primary notification signal (of limited use inside the ship) and a secondary communication signal. The secondary communication signal would be picked up by the nearby remote repeater 81 at the top of the ship and re-broadcast (or "repeated"), in conjunction with its own primary notification signal, to any and all other E.U.N.D.'s in the area, alerting other divers to the occurrence of an emergency as described above.

Figure 9:
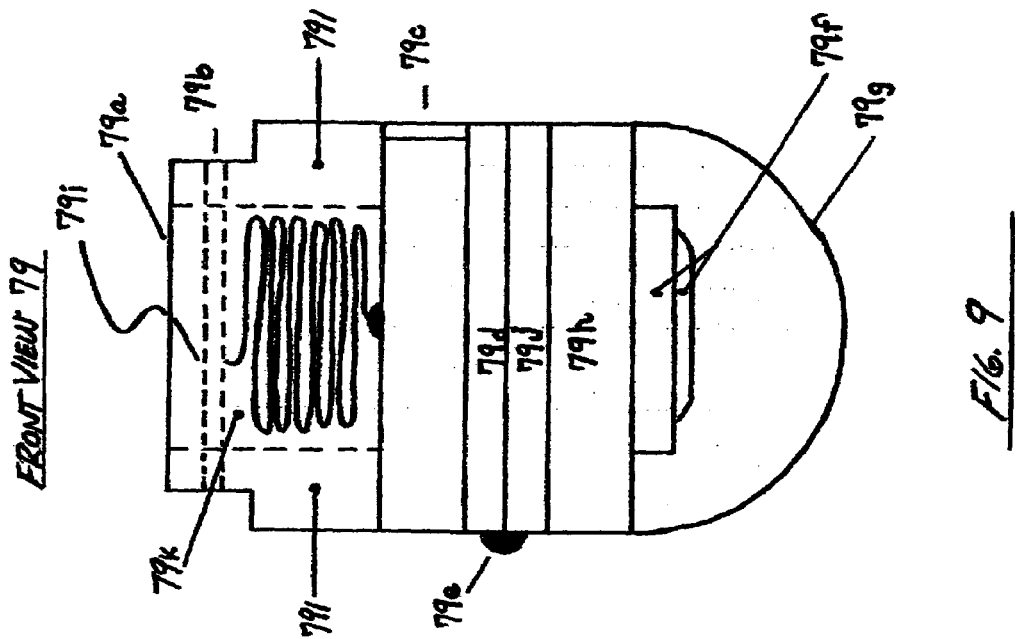
FIG. 9 is a front view of surface signaling package attachment 79.

With reference now to FIG. 9, the surface signaling package 79 will attach to female separation joint 60 in 11b. Surface signaling package 79 is comprised of male separation joint 79a, retaining pin hole 79b, water-tight battery access door w/locking mechanism 79c, electronics package for HSST 79d, water proof 3-way on/off switch 79e, strobe light bulb and mounting fixture 79f, clear lens for strobe light 79g, HSST 79h, lanyard 79i, electronics package for strobe light 79j, lanyard well 79k, and foam insert 79l as shown.

The surface signaling package facilitates the surface notification function described above. That is, the E.U.N.D. is used for surface notification to attract the attention of watercraft and aircraft when activated by a diver in distress. The strobe is highly visible when used on the surface and very effective at night. It is also visible for up to two miles on the water surface, and from even greater distances from the air. Additionally, a diver in distress is able to project an audible signal at the surface that could potentially be heard by their dive boat or other boats in the near area (easily from distances of fifty to one hundred yards). In essence, the surface signaling package duplicates and extends the functionality provided by upper assembly 11a when floated as in the basic E.U.N.D.; however, it greatly extends, to the surface, the reach of the notification signals and communication signals, a feature of great interest to deep-water divers.

With reference now to FIG. 10, the emergency position locator 75 will attach to female separation joint 60 in 11b. Emergency position locator 75 is comprised of male separation joint 75a, retaining pin hole 75b, water-tight battery access door w/locking mechanism 75c, electronics package for EPIRB (Emergency Position Indicating Radio Beacon, an internationally recognized signaling beacon) 75d, water proof on/off switch 75e, EPIRB 75f, rotating EPIRB antenna mounted on side 75g, female separation joint 75h, and lower retaining pin hole 75i as shown. Upon activation of the on/off switch 75e, the EPIRB emits its internationally recognized emergency beacon.

With reference now to FIG. 11, the diving computer 71 will attach to female separation joint 60 in 11b. Diving computer 71 is comprised of male separation joint 71a, retaining pin hole 71b, water-tight battery access door w/locking mechanism 71c, electronics package for diver computer 71d, water proof buttons 71e, infrared interface 71f, LCD (Liquid Crystal Display) 71g, and instructional plaque 71h, female separation joint 71i, and lower retaining pin hole 71j as shown. The diving computer 71 operates in a fashion well known to those of ordinary skill in the art.

Figure 12:
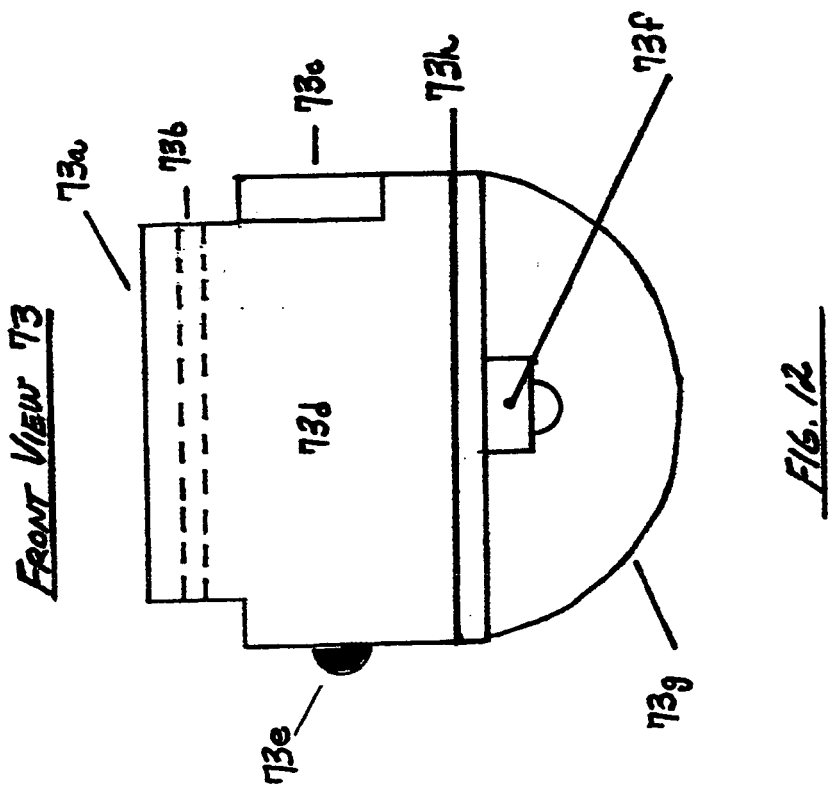
FIG. 12 is a front view of diving light attachment 73.

With reference now to FIG. 12, the diving light 73 will attach to female separation joint 60 in 11b. Diving light 73 comprises male separation joint 73a, retaining pin hole 73b, water-tight battery access door w/locking mechanism 73c, electronics package for dive light 73d, water proof on/off switch 73e, light bulb and mounting fixture 73f, curved lens 73g, and gasket 73h as shown. The diving light 73 is activated through on/off switch 73e.

Figure 13:
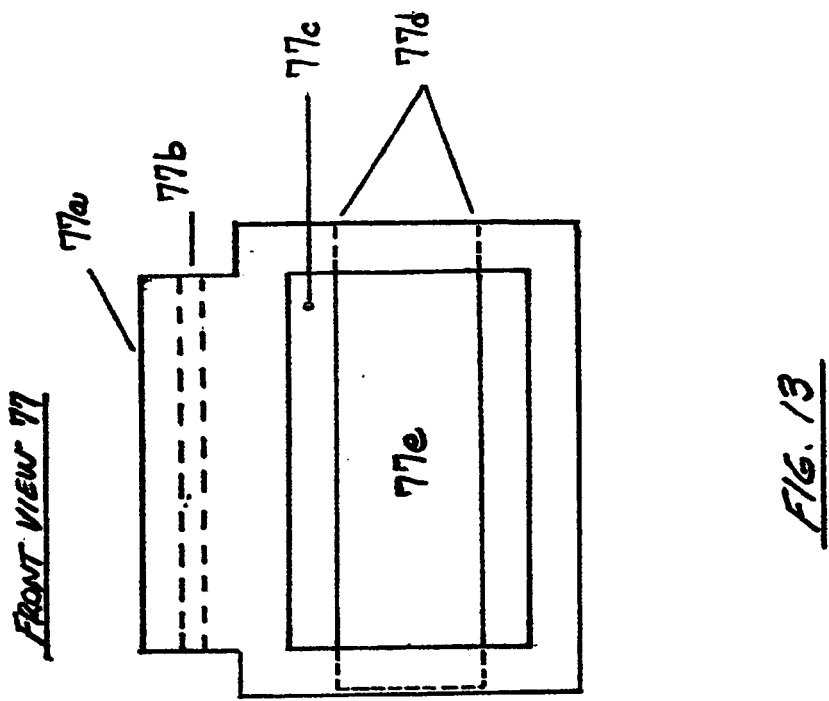
FIG. 13 is a front view of luminous chemical cylindrical tube mount 77.

With reference now to FIG. 13, the mount for luminous chemical cylindrical tube 77 will attach to female separation joint 60 in 11b. The mount 77 comprises male separation joint 77a, retaining pin hole 77b, cut out 77c, hole 77d, and custom luminous chemical cylindrical tube 77e as shown. The luminous chemical cylindrical tube 77 is removed, activated, and returned to position for use.

Illustrative Implementation.

The following listing provides information relating to an illustrative implementation of the invention. The information provided does not represent the only mode of implementation; rather, it represents one embodiment of many of the invention elements, for which there may well be numerous equivalents.

11. Preferred Embodiment/Device body
   Plastic resin or compound or other appropriate material
11a. Upper Assembly
   Positively buoyant with all components
11b. Lower Assembly
   Curved recess in back for hose mounting
13. Top surface
   Domed to aid in buoyancy and provide good reflective properties
   Polycarbonate, acrylic, or other translucent material
   Low water absorption
   High flexural modulus
15. Strobe Light Bulb and mounting fixture
   Krypton, Xenon, or other appropriate bulb type
   Meets or exceeds USCG* and/or SOLAS* standards
17. Electronics Strobe package
   Capacitor of appropriate load/release specs
   Electronic timing device
   Meets or exceeds USCG* and/or SOLAS* standards
   Grounding capability
   Wires and connectors
   Misc. electrical components—resistors, coils, amplifiers, etc.
19. Upper Assembly battery compartment
   Appropriate size to contain battery(ies) of suitable voltage
   Contacts and leads
   Wires
21. Optional Compartment for buoyancy
23a. Water-tight battery access door w/locking mechanism
   Water proof to 400 ft.
   Circular thumb screw w/coin slot
   O-ring or gasket
23b. Water-tight battery access door w/locking mechanism
   Water proof to 400 ft.
   Circular thumb screw w/coin slot
   O-ring or gasket
25. External manual on/off switch
   Water proof to 400 ft
27a. HSST Assembly-Internal/external Hydrophone, Speaker, Siren, and/or Transducer (HSST)
   Able to send and/or receive audible and/or inaudible frequencies
   Covering the frequency range from 0.1 Hz. To 2 MHz.
   Operable over a wide temperature range, from 0° C. to 100° C.
27b. HSST Assembly-Internal/external Hydrophone, Speaker, Siren, and/or Transducer (HSST)
   Able to send and/or receive audible and/or inaudible frequencies
   Covering the frequency range from 0.1 Hz. To 2 MHz.
   Operable over a wide temperature range, from 0° C. to 100° C.
29. Momentary switch
   Water proof to 400 ft.
31a. HSST electronics package
   Timing circuit
   Wires, leads, connectors
   Grounding capability
   Misc. electrical components—resistors, coils, amplifiers, etc.
31b. HSST electronics package
   Timing circuit
   Wires, leads, connectors
   Grounding capability
   Misc. electrical components—resistors, coils, amplifiers, etc.
33. Lanyard compartment
35. Lanyard
   Braided Nylon or other suitable material
   Breaking strength of approx. 400 lb./inch
   1/16 to 1/4 inch diameter
   Brightly colored
   Clip connectors at each end
   10 ft. to 50 ft. length
37. Lanyard connector
   Stainless steel or other appropriate material
   Loop or eyelet to connect lanyard to embodiment
   Ability to swivel
   Press fit, threaded, or molded into assemblies 11a and 11b
39. Foam insert
   Aids buoyancy of 11a
   1/16 to 1 in. thick or thicker as necessary
   Appropriate foam or other buoyant material
41. Automatic emergency activation contact switch
   Activates 31 in both 11a and 11b
   Completes circuit when 11a deployed in emergency situation
   Water proof to 400 ft.
43. Female separation joint
   Molded in to base of 11a
   Designed to fit w/49
45. Hole for retaining pin
   Diameter D+x (where D=diameter of pin and x—clearance necessary for easy removal of pin)
47. Emergency activation retaining pin
   Stainless steel, aluminum or other suitable material i.e. nylon or other plastics
   1/8 inch diameter, D, or larger if required
   Open loop on one end with lanyard and handle for separation and activation of unit
   Hole drilled for cotter pin
   Cotter pin to help prevent accidental deployment
   Spring-loaded ball recessed in to end of pin to help prevent accidental deployment
49. Male separation joint
   Molded in to top of 11b
   Designed to fit w/43
51. Hole for retaining pin
   Diameter D+y (where D=diameter of pin and y=clearance necessary for easy removal of pin)
53. Master on/off switch
   Lighted to indicate when power is on
   Audible ping to indicate when power has been switched on
   Water proof to 400 ft.
55. Lower Assembly battery compartment
   Appropriate size to contain battery(ies) of suitable voltage
   Contacts and leads Wires
Space for battery to power 57
57. Telemetry recording device
Battery of appropriate size, type and power level
Timer
Pressure sensor to determine depth
Thermocouple/thermometer to record water temperature
Data storage device, i.e. memory chip or other suitable device
Data link/data transfer capability by infrared or any other suitable means
LCD* to display all data
57*a*. Telemetry display
57*b*. Telemetry display buttons
59. Hole for retaining pin
Diameter D+x (where D=diameter of pin and x=clearance necessary for easy removal of pin)
60. Female separation joint
Molded in to base of 11*b*
Designed to fit w/71*a*, 73*a*, 75*a*, 77*a*, 79*a*, and 81*a*
61. Slot for strap attachment
Located on back of 11*b*
62. Velcro strap and retainer
Includes plastic insert with appropriate curve (complementing curve in 11*b*) for hose mounting
63. Safety retention lanyard
Braided Nylon or other suitable material
Breaking strength of approx. 400 lb./inch
1/16 to 1/4 inch diameter
Brightly colored
Clip connectors at each end
ft. to 50 ft. length
Plastic clip, closed loop or other fastener to attach to diver or dive equipment
67. Metal sleeve insert
Stainless steel, aluminum or other suitable material
Sized to appropriate inner and outer diameters
69. Metal sleeve insert
Stainless steel, aluminum or other suitable material
Sized to appropriate inner and outer diameters
70. Recessed lanyard connection point
71. Diving computer
Contained in molded plastic compartment w/holes for attachment via pin 47
Attaches to bottom of 11*b* with pin 47 through holes 59
Performs all standard dive computer functions
71*a*. Male separation joint
71*b*. Retaining pin hole
71*c*. Water-tight battery access door w/locking mechanism
71*d*. Electronics package for dive computer
71*e*. Water proof buttons
71*f*. Infrared interface
71*g*. LCD (Liquid Crystal Display)
71*h*. Instructional plaque
71*i*. Female separation joint
71*j*. Lower retaining pin hole
73. Diving light
Contained in molded plastic compartment w/holes for attachment via pin 47
Attaches to bottom of 11*b* with pin 47 through holes 59
Various colored lens inserts
On/off switch, water proof to 400 ft.
73*a*. Male separation joint
73*b*. Retaining pin hole
73*c*. Water-tight battery access door w/locking mechanism
73*d*. Electronics package for dive light
73*e*. Water proof on/off switch
73*f*. Light bulb and mounting fixture
73*g*. Curved lens
73*h*. Gasket
75. Emergency position locator
Contained in molded plastic compartment w/holes for attachment via pin 47
Attaches to bottom of 11*b* with pin 47 through holes 59
On/off switch, water proof to 400 ft.
Transmits signal over a frequency range receivable by "fish finders" and/or sonar
75*a*. Male separation joint
75*b*. Retaining pin hole
75*c*. Water-tight battery access door w/locking mechanism
75*d*. Electronics package for EPIRB *
75*e*. Water proof on/off switch
75*f*. EPIRP*
Meeting or exceeding USCG* and SOLAS* standards
75*g*. Rotating EPIRB* antenna mounted on side
75*h*. Female separation joint
75*i*. Lower retaining pin hole
77. Mount for luminous chemical cylindrical tube
Contained in molded plastic compartment w/holes for attachment via pin 47
Attaches to bottom of 11*b* with pin 47 through holes 59
Hole of appropriate diameter to securely hold a luminous chemical cylindrical tube ("glow stick")
77*a*. Male separation joint
77*b*. Retaining pin hole
77*c*. Cut out
77*d*. Hole
77*e*. Custom luminous chemical cylindrical tube
79. Surface signaling package
Contains strobe light and HSST* to signal boat
Longer lanyard (150–200 ft.) to ensure ability to reach surface
Electronics necessary to perform required functions
Foam or other buoyant material
Waterproof battery compartment
Waterproof activation switch
Meets or exceeds USCG* and/or SOLAS* standards
Attaches to bottom of 11*b* with pin 47 through holes 59
79*a*. Male separation joint
79*b*. Retaining pin hole
79*c*. Water-tight battery access door w/locking mechanism
79*d*. Electronics package for HSST*
79*e*. Water proof 3-way on/off switch
79*f*. Strobe Light Bulb and mounting fixture
79*g*. Clear lens for Strobe Light
79*h*. HSST*
79*i*. Lanyard
150–200 ft. to ensure ability to reach surface
79*j*. Electronics package for strobe light
79*k*. Lanyard well
79*l*. Foam insert
81. Remote repeater
negative buoyant
81*a*. Male separation joint
81*b*. Retaining pin hole
81*c*. Water-tight battery access door w/locking mechanism
81*d*. Electronics package for HSST*
81*e*. Water proof 3-way on/off switch
81*f*. Strobe Light Bulb and mounting fixture
81*g*. Clear lens for Strobe Light
81*h*. HSST*
81*i*. Electronics package for strobe light
In the above illustrative material the following acronyms have the following meanings: (a) USCG—United States Coast Guard; (b) SOLAS—Safety Of Life At Sea; (c) HSST—Hydrophone, Siren, Speaker, Transducer Assembly; (d) LCD—Liquid Crystal Display; and (e) EPIRB—Emergency Position Indicating Radio Beacon.

Although the invention has been described with reference to a preferred embodiment, this description is not to be construed in a limiting sense. Various permutations and modifications of the disclosed embodiment, including its enumerated features, as well as alternative embodiments of the invention, will become apparent to persons skilled in the art upon reference to this specification.

We claim:

1. A notification device comprising:
   (a) an activator;
   (b) one or more primary signal emitters, said one or more primary signal emitters to each emit a primary notification signal upon activation of the activator;
   (c) one or more secondary signal emitters, said one or more secondary signal emitters to each emit a secondary communication signal upon activation of the activator;
   (d) one or more receivers capable of receiving communication signals;
   (e) one or more tertiary signal emitters, said one or more tertiary signal emitters to each emit a tertiary communication signal upon receipt by the receiver of either a secondary communication signal or a tertiary communication signal from another notification device; and
   (f) one or more quaternary signal emitters, said one or more quaternary signal emitters to each emit a quaternary notification signal upon receipt by the receiver of either a secondary communication signal or a tertiary communication signal from another notification device.

2. The notification device of claim 1 wherein said primary signal emitter emits a primary notification signal comprising light waves.

3. The notification device of claim 1 wherein said primary signal emitter emits a primary notification signal comprising sound waves.

4. The notification device of claim 1 wherein said secondary signal emitters emit a secondary communication signal comprising electromagnetic waves.

5. The notification device of claim 1 wherein said tertiary signal emitters emit a tertiary communication signal comprising electromagnetic waves.

6. An underwater notification device comprising:
   (a) an activator;
   (b) one or more primary signal emitters, said one or more primary signal emitters to each emit a primary notification signal upon activation of the activator;
   (c) one or more secondary signal emitters, said one or more secondary signal emitters to each emit a secondary communication signal upon activation of the activator;
   (d) one or more receivers capable of receiving communication signals;
   (e) one or more tertiary signal emitters, said one or more tertiary signal emitters to each emit a tertiary communication signal upon receipt by the receiver of either a secondary communication signal or a tertiary communication signal from another underwater notification device; and
   (f) one or more quaternary signal emitters, said one or more quaternary signal emitters to each emit a quaternary notification signal upon receipt by the receiver of either a secondary communication signal or a tertiary communication signal from another underwater notification device.

7. The underwater notification device of claim 6 wherein said primary signal emitter emits a primary notification signal comprising light waves.

8. The underwater notification device of claim 6 wherein said secondary signal emitters emit a secondary communication signal comprising electromagnetic waves.

9. The underwater notification device of claim 6 further comprising a detachable remote repeater, said remote repeater emitting primary notification signals and secondary communication signals upon receipt of secondary communication signals from said underwater notification device.

10. The underwater notification device of claim 6 wherein said underwater notification device is buoyant and wherein said underwater notification device further comprises an attached lanyard.

11. The underwater notification device of claim 6 further comprising a telemetry recording device logging dive conditions and incidents occurring from the time said telemetry recording device is turned on.

12. The underwater notification device of claim 6 further comprising a telemetry recording device logging dive conditions and incidents occurring from the time said underwater notification device is activated by a user diver in distress.

13. The underwater notification device of claim 6 further comprising an emergency position locator device.

14. The underwater notification device of claim 6 further comprising a dive computer.

15. A network of underwater notification devices, each of said underwater notification devices comprising:
   (a) an activator;
   (b) one or more primary signal emitters, said one or more primary signal emitters to each emit a primary notification signal upon activation of the activator;
   (c) one or more secondary signal emitters, said one or more secondary signal emitters to each emit a secondary communication signal upon activation of the activator;
   (d) one or more receivers capable of receiving communication signals;
   (e) one or more tertiary signal emitters, said one or more tertiary signal emitters to each emit a tertiary communication signal upon receipt by the receiver of either a secondary communication signal or a tertiary communication signal from another underwater notification device; and
   (f) one or more quaternary signal emitters, said one or more quaternary signal emitters to each emit a quaternary notification signal upon receipt by the receiver of either a secondary communication signal or a tertiary communication signal from another underwater notification device.

16. The network of underwater notification devices of claim 15 wherein said primary signal emitter of at least one of said underwater notification devices emits a primary notification signal comprising light waves.

17. The network of underwater notification devices of claim 15 wherein said secondary signal emitter of at least one of said underwater notification devices emits a secondary communication signal comprising electromagnetic waves.

18. The network of underwater notification devices of claim 15 wherein at least one of said underwater notification devices further comprises a telemetry recording device logging dive conditions and incidents occurring from the time said telemetry recording device is turned on.

19. The network of underwater notification devices of claim 15 wherein at least one of said underwater notification devices further comprises a telemetry recording device logging dive conditions and incidents occurring from the time said underwater notification device is activated by a user diver in distress.

20. The network of underwater notification devices of claim 15 wherein at least one of said underwater notification devices further comprises an emergency position locator device.

* * * * *